(12) United States Patent
Lindgren

(10) Patent No.: US 8,117,119 B2
(45) Date of Patent: *Feb. 14, 2012

(54) SYSTEMS AND METHODS OF TRADING CLOSED LOANS, DEBT, AND OTHER FINANCIAL OBLIGATIONS

(75) Inventor: Daniel N. Lindgren, St. Louis Park, MN (US)

(73) Assignee: General Mortgage Finance Corp., St. Louis Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,997

(22) Filed: Feb. 22, 2010

(65) Prior Publication Data
US 2010/0153305 A1 Jun. 17, 2010

Related U.S. Application Data

(63) Continuation of application No. 12/062,004, filed on Apr. 3, 2008, now Pat. No. 7,698,214.

(60) Provisional application No. 60/909,807, filed on Apr. 3, 2007.

(51) Int. Cl.
*G06Q 40/00* (2006.01)

(52) U.S. Cl. ........................................................ 705/38

(58) Field of Classification Search ...................... 705/38
See application file for complete search history.

(56) References Cited

U.S. PATENT DOCUMENTS

| | | | | |
|---|---|---|---|---|
| 5,995,947 A | * | 11/1999 | Fraser et al. ..................... | 705/38 |
| 6,233,566 B1 | * | 5/2001 | Levine et al. ................ | 705/36 R |
| 6,691,094 B1 | * | 2/2004 | Herschkorn ..................... | 705/37 |
| 7,035,820 B2 | * | 4/2006 | Goodwin et al. ............... | 705/37 |
| 7,584,139 B2 | * | 9/2009 | Goodwin et al. ............... | 705/37 |
| 2002/0038285 A1 | * | 3/2002 | Golden et al. .................. | 705/38 |
| 2002/0059131 A1 | * | 5/2002 | Goodwin et al. ............... | 705/37 |
| 2003/0220867 A1 | * | 11/2003 | Goodwin et al. ............... | 705/37 |

(Continued)

OTHER PUBLICATIONS

Ptacek, Megan J., "Popularity of On-Line Auctions on the Rise Origination and Secondary Mortgage Trading Markets Find a Home on the Net", American Banker. New York, N.Y.: Mar. 24, 2000. vol. 165, iss. 58; p. 12.A.*

(Continued)

*Primary Examiner* — Sarah Monfeldt
*Assistant Examiner* — Mohammad Z Shaikh
(74) *Attorney, Agent, or Firm* — Patterson Thuente Christensen Pedersen, P.A.

(57) ABSTRACT

A method of trading individual, closed residential mortgage loans without loans being presented in a structured pool. The method includes authorizing a file associated with an individual, closed residential mortgage loan to be made available to a plurality of potential buyers and converting information in the file into electronic file data for submittal to the plurality of potential buyers. The information in the file includes information of importance to the potential buyer in understanding the loan. The method also includes making the electronic file data available to the plurality of potential buyers for review and purchase without pooling or averaging the electronic file data prior to making it available to the plurality of potential buyers, and prior to bidding, thereby making the risk of the individual, closed mortgage loan transparent to the plurality of potential buyers; receiving a bid from one or more of the potential buyers on the individual, closed residential mortgage loan; accepting the bid and forwarding a note associated with the file to a clearing agency for delivery to the potential buyer; and receiving funds from the clearing agency into a seller account as payment for the individual, closed residential mortgage loan.

9 Claims, 3 Drawing Sheets

U.S. PATENT DOCUMENTS

| | | | | |
|---|---|---|---|---|
| 2004/0220872 | A1* | 11/2004 | Pollock, III | 705/38 |
| 2005/0108125 | A1* | 5/2005 | Goodwin et al. | 705/35 |
| 2006/0010056 | A1* | 1/2006 | De La Motte | 705/35 |
| 2006/0089895 | A1* | 4/2006 | Joye et al. | 705/35 |
| 2006/0129477 | A1* | 6/2006 | Goodwin et al. | 705/37 |
| 2006/0155594 | A1* | 7/2006 | Almeida et al. | 705/7 |
| 2006/0218079 | A1* | 9/2006 | Goldblatt et al. | 705/38 |

OTHER PUBLICATIONS

"Bid4Assets.com to Participate in FDIC Online Loan Sale Pilot; $12 Million Pool of Home Equity Loans Being Sold on Bid4Assets. com", PR Newswire. New York: Sep. 19, 2000. p. 1.*

Elul, Ronel, "The Economics of Asset Securitization", Business Review—Federal Reserve Bank of Philadelphia, pp. 16-25, Third Quarter 2005.*

DebtX::Home, http://www.debtx.com, Mar. 28, 2008.

DebtX::DXSyndicate™, http://www.debtx.com/Corporate/Products/DXSyndicate.asp, Mar. 28, 2008.

DebtX::DXParticipate™, http://www.debtx.com/Corporate/Products/DXParticipate.asp, Mar. 28, 2008.

DebtX::DXOpen™, http://www.debtx.com/Corporate/Products/DXOpen.asp, Mar. 28, 2008.

File History for U.S. Appl. No. 12/062,004, filed Apr. 3, 2008.

* cited by examiner

SYSTEMS AND METHODS OF TRADING CLOSED LOANS, DEBT, AND OTHER FINANCIAL OBLIGATIONS

RELATED APPLICATION

This application is a continuation of application Ser. No. 12/062,004 filed Apr. 3, 2008, which claims the benefit of U.S. Provisional Application No. 60/909,807 filed Apr. 3, 2007, each of which is hereby fully incorporated herein by reference.

FIELD OF THE INVENTION

The present invention relates to the trading of financial instruments. More particularly, the present invention relates to systems and methods of trading closed loans, debt, and other financial obligations.

BACKGROUND OF THE INVENTION

Existing trading exchanges for debt and equity securities rely on open-market forces to efficiently and reliably match buyers and sellers of financial securities. These exchanges may incorporate a traditional trading floor where participants gather at a common location to negotiate the buying and selling of financial instruments. More recently, Internet-based technology has enabled electronic exchanges to facilitate the trading of financial instruments, absent a brick-and-mortar trading floor. In some cases, a combination of face-to-face trading occurs in conjunction with remote electronic trading, as in well-known exchanges such as the New York Stock Exchange. Regardless of the forum, trade in a wide variety of financial instruments feeds the activities of exchanges throughout the world.

With respect to debt instruments, most exchange-based trading occurs in securitized debt such as bonds, T-bills, commercial paper and so on. Cash instruments, such as loans, are usually traded in the secondary market as pools of loans, rather than individual loans. For example, large institutional investors, such as Freddie Mac, buy closed mortgage loans in pools. The pools may then be securitized and sold to other investors as mortgage-backed securities.

However, such loan pools do not address the risk of individual closed loans. Loan pools group individual loans that may have similar risk characteristics, but the pool itself is sold as a single investment, with a single average risk characteristic, leaving little or no transparency as to the risk of the individual loans within the pool. As a result, an investor is unable to screen individual loans and make purchasing decisions based on the risk-level of an individual loan. Furthermore, individual closed loans tend to be illiquid trading instruments. Not surprisingly then, most buying and selling of closed loans is accomplished through private deals between buyers and sellers.

Until recently, the availability of loan pools in individual closed loans through established trading platforms and private networks served the needs of the industry. However, with delinquency and default rates suddenly rising, investors previously content with trading in loan pools no longer can tolerate their hidden risks.

When interest rates were at all-time lows, subprime lenders made loans to borrowers with poor credit histories. Many of these loans ended up in loan pools in the secondary market, where the individual risk of such loans are often masked by the overall average risk of the loan pool and aided by the inaccessibility of loan-file details. The market value of many of these loans now lies below face value, which has created a subprime crisis, and forced many large lenders and investors to close or file bankruptcy.

Many investors previously content with purchasing loans in the aggregate now recognize the need to scrutinize their debt instrument investments on a loan-by-loan basis, possibly building their own loan pools through individual purchases. However, existing trade exchanges are not structured to support such transactions, nor can limited private networks efficiently accommodate the new demand. Therefore, there exists a need in the financial industry for an efficient trading system to facilitate the buying and selling of individual closed loans, especially closed residential mortgage loans.

SUMMARY OF THE INVENTION

In one embodiment, the present invention is a method of trading individual, closed residential mortgage loans, without loans being presented in a structured pool. The method includes authorizing a file associated with an individual, closed residential mortgage loan to be made available to a plurality of potential buyers and converting information in the file into electronic file data for submittal to the plurality of potential buyers. The information in the file includes one or more of loan application, loan summarization, insurance information, appraisal information, copy of note, copy of security instrument, payment history, principal balance, settlement statement, income or other verifications, closing documents, credit report, current servicing information, recapture and repurchase information, and risk-rating instruments, for the individual, closed residential mortgage loan. The method also includes making the electronic file data available to the plurality of potential buyers for review and purchase without pooling or averaging the electronic file data prior to making it available to the plurality of potential buyers, thereby making the risk of the individual, closed mortgage loan transparent to the plurality of potential buyers; receiving a bid from one or more of the potential buyers on the individual, closed residential mortgage loan; accepting the bid and electronically forwarding a note associated with the file to a clearing agency for delivery to the potential buyer; and receiving funds from the clearing agency into a seller account as payment for the individual, closed residential mortgage loan.

DETAILED DESCRIPTION

The present invention provides systems and methods of trading in debt instruments, including closed loans. In one embodiment, buying and selling is conducted in person in a brick-and-mortar marketplace with the assistance of a computer. In another embodiment, trading is conducted using an electronic or telephonic system that does not require the physical presence of all participants at, or near, the marketplace. In all embodiments, the present invention provides liquidity to a traditionally non-liquid asset, adding value to the debt instrument and the industry.

Figure 1:
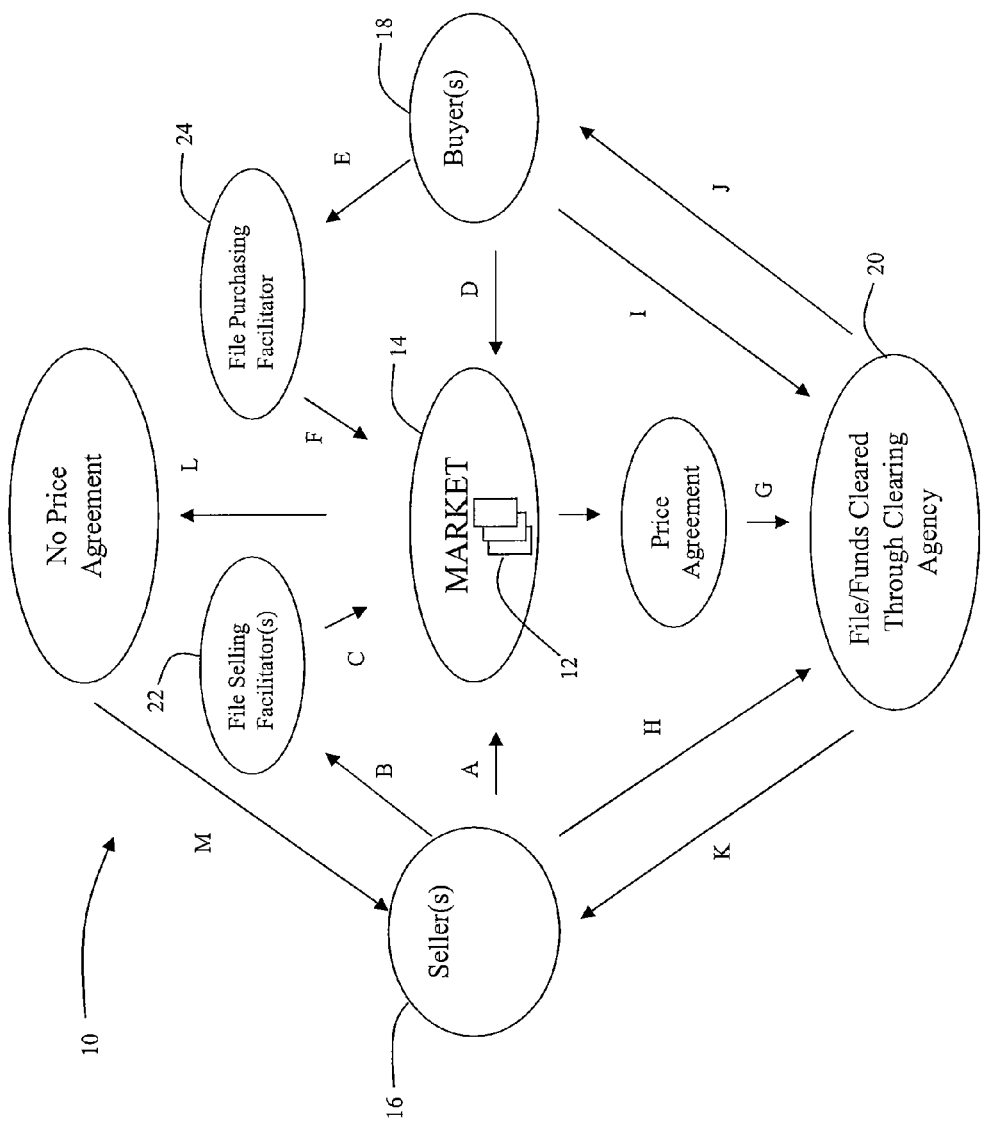
FIG. 1 is a diagram of one embodiment of a debt instrument trading system of the present invention.

Referring to FIG. 1, one embodiment of the present invention is a debt instrument trading system 10. Debt instrument trading system 10 includes debt instrument file 12, centralized marketplace 14, selling participant 16, buying participant 18, and clearing agency 20. System 10 may also include file-selling facilitator 22 and file-purchasing facilitator 24. In one embodiment, facilitators may be independent brokers selected from a multitude of brokers primarily representing one side of a transaction. In some cases, facilitators may coincidentally represent both sides, but typically this is not the case.

Debt instrument file 12 may be a closed loan, such as a residential mortgage loan, or another type of closed loan paper. Files 12 do not include loans being presented in a structured pool, such as loans meant for bidding as a group of two or more loans, and not individual loans. Loans can only be bid on an individual loan basis.

Centralized marketplace 14 facilitates the trading of debt instruments by providing an open-market forum for selling participants 16 to disclose information on specific, individual loans available to potential buying participants 18. Centralized marketplace 14 may be a trading floor where participants 16 and 18 may view and trade files 12, as described in more detail below. Alternatively, marketplace 14 may be an electronic forum as also described below, or some combination of a brick-and-mortar trading floor and an electronic trading floor.

centralized marketplace 14. As such, members of centralized marketplace 14 act as trade facilitators, rather than having all trades be facilitated by a single common broker, primarily representing both sides of the transaction, that may also provide advice, as is done in some known models. In this embodiment, no broker primarily representing both sides simultaneously operates to bring buyers and sellers together.

Known exchanges or systems that rely on such a centralized broker to arrange deals are largely discount operations. Although such a model has potential to reduce brokerage fees, this model or platform cannot typically support premium pricing of higher quality loans that result from two broker fees, namely one for originating the loan application and one for selling the loan. Further, system 10 of the present invention may actually reduce overall fees by eliminating broker fees in some cases, with only a relatively small transaction fee being charged to the participants.

Clearing agency 20 may be a financial services company that provides clearing and settlement services, facilitating the transfer of cash funds and files 12 between marketplace 14 participants, operating in much the same way that known clearing agencies, or clearing houses, operate in other financial marketplaces. The use of an independent clearing agency 20 differs from some known models in which a centralized facilitator or broker that arranged the trade also provides clearing and settlement services.

In addition to the parties above, debt instrument trading system 10 also includes a number of transactions or steps A-M as shown in Table 1 below:

TABLE 1

| Step | Description |
|------|-------------|
| A | Selling participant 16 makes file 12 to available marketplace 14. |
| B | Alternative to A: Selling participant 16 authorizes file 12 to be made available to marketplace 14 through file selling facilitator 22. |
| C | Alternative to A: File selling facilitator 22 makes file 12 available to marketplace 14. |
| D | Buying participant 18 enters marketplace 14. |
| E | Alternative to D: Buying participant 18 enters marketplace 14 through file-purchasing facilitator 24. |
| F | Alternative to D: File-purchasing facilitator 24 enters marketplace 14 for buying participant 18. |
| G | If buying and selling participants 16 and 18 reach a price agreement, file 12 is delivered to clearing agency 20. |
| H | Selling participant 16 delivers note (not shown) associated with file 12 to clearing agency 20. |
| I | Buying participant 18 submits cash for file 12 into account via clearing agency 20. |
| J | Clearing agency 20 delivers file 12 to buying participant 18. |
| K | Clearing agency 20 delivers funds to account of selling participant 16. |
| L | Alternative to G: no price agreement is reached. |
| M | File 12 is removed from marketplace 14 and in some embodiments, file 12 is returned to selling participant 16. |

Selling participant 16 may be an individual seller or mortgage broker representing themselves in the transaction, or may be a representative of a financial company, group, or other entity. Similarly, file-selling facilitator 22 may be an individual or an entity representative that serves and represents selling participant 16 by presenting file 12 information, or loan information, to marketplace 14, and completing transactions on behalf of selling participant 16.

Buying participant 18 may represent himself or herself, or larger entities in their marketplace transactions. File-purchasing facilitator 24 may assist or represent buying participant 18 in marketplace 14.

In one embodiment, participating in trading in centralized marketplace 14 requires that selling participant 16, buying participant 18, or their representatives, be members of the System 10 may not implement all of Steps A through M above. Furthermore, Steps A through M may or may not be implemented in the order listed in Table 1 above, and may vary from embodiment to embodiment.

Implementation of the algorithm described in Table 1 may be accomplished through the use of a special-purpose computer or microprocessor programmed to perform any or all steps of the algorithm.

Referring still to FIG. 1, in one embodiment, a selling participant submits file 12 to centralized marketplace 14 at Step A. Alternatively, selling participant 16 instructs file-selling facilitator 22 to submit file 12 to marketplace 14 at Step B, followed by file-selling facilitator 22 submitting file 12 to marketplace 14. In one embodiment, file 12 is physically placed into the marketplace for viewing, in another, information representing file 12 is presented in an electronic format to marketplace 14.

Files 12 may be delivered to marketplace 14 with required information including, but not limited to: 1003 and 1008 (i.e., loan applications and loan summarizations) required disclosures, insurance information (e.g., homeowners, title, mortgage, other), appraisal information, copy of note, copy of security instrument with filing information (if applicable), payment history, principle balance, settlement statement, certificate that loan meets all federal, state, and local regulations, income, employment, or other verifications, all related closing documents, credit report, all related verifications, Automated Valuation Method (AVM), flood certification, Mortgage Insurance certificate showing terms and coverage, any other standardized risk rating instruments, and any written or verbal agreements with a borrower associated with the loan.

Further, information related to current servicing may also be included. This information may include, but not be limited to servicer calls log with collection activity and/or any foreclosure information, payment history, any payment agreements/deferments, and so on. Also included may be whether servicing will be released or retained.

Also included in the above information, or separately as a term of the sale, may be whether the seller is offering any recapture, and terms of recapture payment. As those skilled in the art will understand, recapture is when the seller is willing to refund the buyer some or all of the premium paid for a loan in the event of pre-payment. When a seller is willing to offer some form of recapture, if the loan sells at a premium, potential buyers should be willing to pay more for the loan.

Finally, in states where it is still allowed, or on loans where it was put in place when it was still legal, file 12 may also include information on pre-payment penalty and related terms. At Step D, buying participant 18 enters marketplace 14, either physically or virtually, and accesses file 12 for review and possible purchase.

As described in the steps above, in one embodiment, system 10 is especially adapted to facilitate the trading of closed residential mortgage loans, as opposed to closed commercial loans.

In one embodiment, trading in centralized marketplace 14 is accomplished through a "bid-offer" process, where selling participants 18 offer a selling price of file 12, and buying participants bid the price they are willing to pay. Often this price is presented in the form of a percentage of the loan principal, e.g., 102% or 97.4%. In other embodiments, other methods of setting selling and buying prices may be used. Additionally, marketplace 14 may enable the selling of individual loan files 12, or groupings of multiple loan files 12. However, even if files 12 are grouped for sale, the loans are still being bought and sold on an individual loan basis, rather than on a loan pool basis that relies on averaging. As such, the risk on each individual loan or file 12 is transparent to buying participant 18. Furthermore, trading in this open-market occurs with potential for near-simultaneous, multiple bidding.

In all cases, a final price is determined by the bid/offer method of price discovery, and not by a proprietary pricing model or other method of predetermining price. As such, system 10 avoids reliance upon potentially flawed pricing engines or models that may remain transparent to market participants. Such proprietary pricing models may also rely upon flawed historical data, thereby producing unsound prices upon which the participants rely. The present invention avoids this issue by relying upon market forces to determine final pricing.

Alternatively, buying participant 18 enters marketplace 14 through file-purchasing facilitator 24 at Step E, who in turn enters marketplace 14 at Step F, receiving file 12 information.

If the bid presented by buying participant 18 or file-purchasing facilitator 24 matches the marketplace 14 offer presented by selling participant 16 or file-selling facilitator 22, or if buying participant 18 makes a bid otherwise acceptable to selling participant 16, at Step G, the transaction progresses to clearing agency 20.

After price agreement is reached, selling participant 16 forwards a note associated with file 12 to clearing agency 20 at Step H, while buying participant 18 deposits payment for the note into an account with clearing agency 20 at Step I. Subsequently, clearing agency 20 delivers the note to buying participant 18 at Step J, and funds to selling participant 16 at Step K, completing the transaction.

However, if no price agreement is reached at Step L, file 12 is removed from marketplace 14, and returned to selling participant 16 at Step M.

Figure 2:
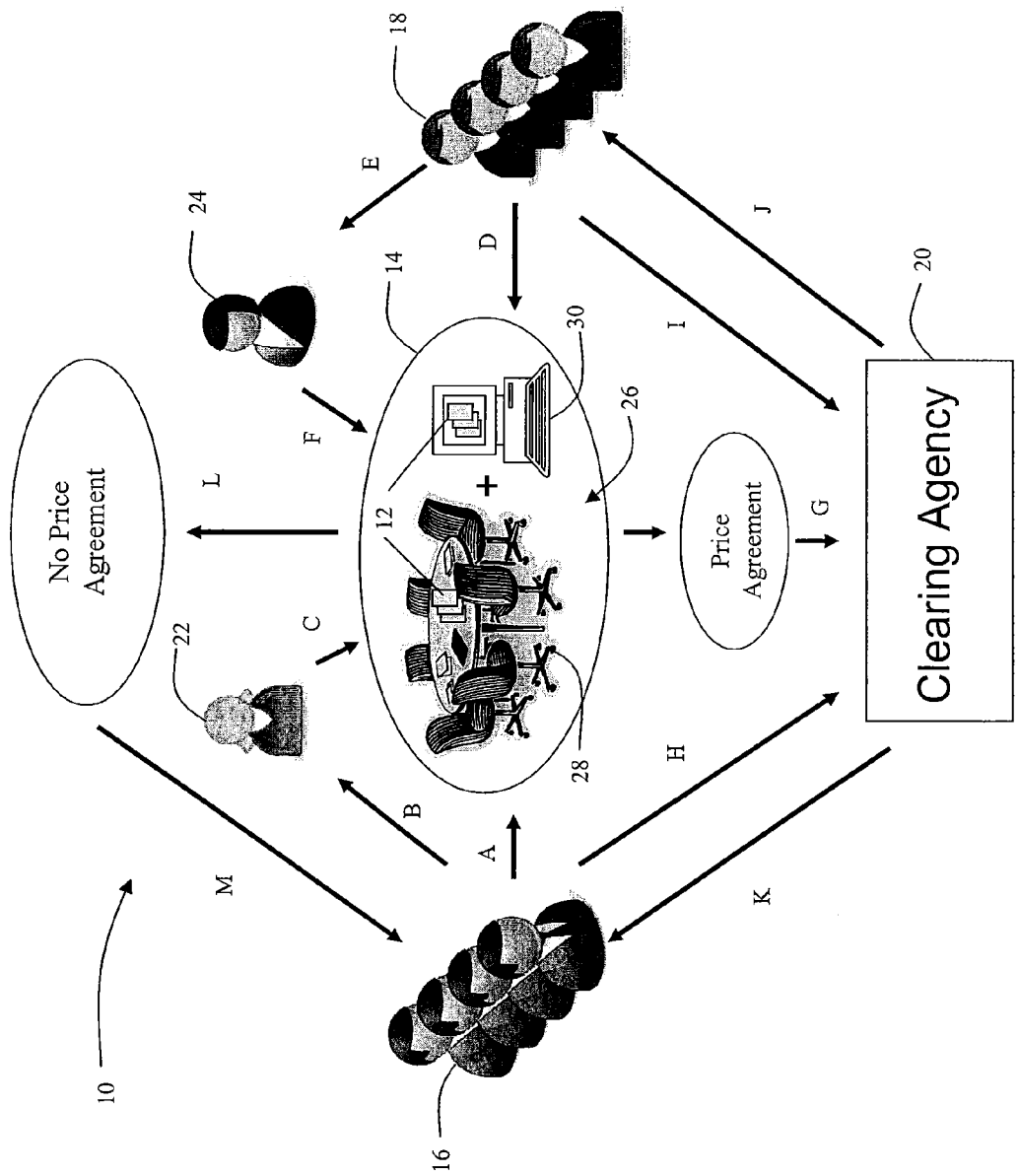
FIG. 2 is a diagram of one embodiment of a debt instrument trading system of the present invention that utilizes a computer-assisted brick-and-mortar marketplace.

Referring now to FIG. 2, debt instrument trading system 10 may facilitate trading of a financial obligation primarily through transactions and negotiations conducted at least partly at a common physical location. In the embodiment of debt instrument trading system 10 depicted in FIG. 2, marketplace 14 may be a trading floor housed in a building or physical structure, and may include file presentation and containment devices 26. Devices 26 may be as simple as a table 28 upon which files 12 in paper format are placed by selling participants 16 or file-selling facilitator 22 for review by prospective buying participants 18 or file-purchasing facilitator 24. Devices 26 may also include computerized file presentation system 30 to present file 12 information. Computer file presentation system 30 may include a single computer terminal, a computer server, one or more computer terminals connected to a LAN or WAN, or other variations of computer systems and electronic data-storage devices used to make file 12 data available for viewing by participants.

The embodiment of system 10 as depicted in FIG. 2 operates in essentially the same fashion as the embodiment described previously in FIG. 1. One or more selling participants 16 make files 12 available to potential buying participants 18 by providing files 12 to marketplace 14. Buying participants 18 review files 12, and if a price agreement is reached, clearing agency 20 facilitates the exchange of funds and files 12.

Figure 3:
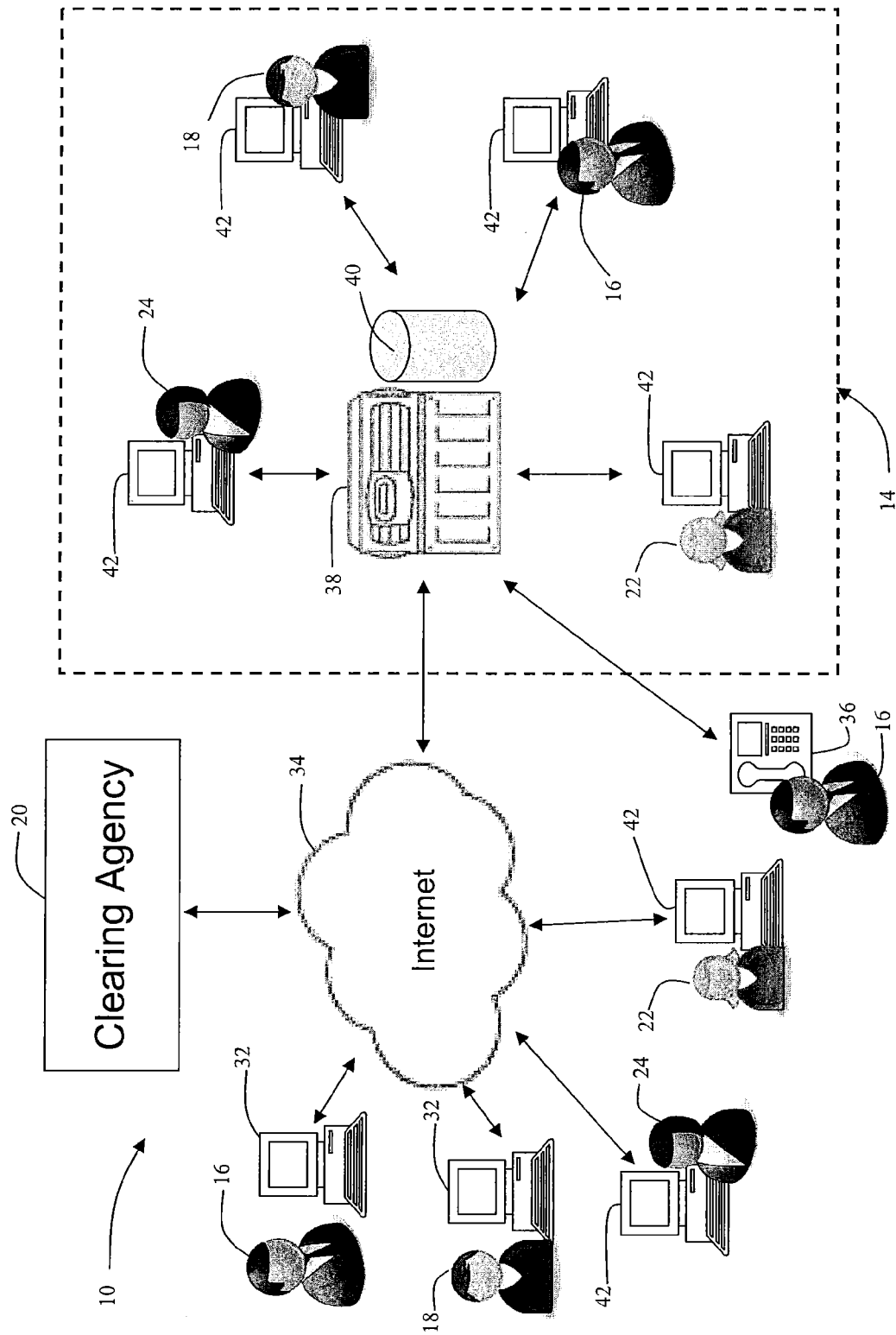
FIG. 3 is a diagram of one embodiment of a debt instrument trading system of the present invention that utilizes an electronic marketplace.

Referring now to FIG. 3, in another embodiment of system 10, trading is conducted at least partially, and in some embodiments completely, through electronic and telephonic methods. The embodiment of system 10 as depicted in FIG. 3 includes a marketplace 14, selling participants 16, buying participants 18, remote computer terminals 32, clearing agency 20, Internet 34, and telephone network 36. In this embodiment, marketplace 14 includes central server 38 with database 40, connected to local computer terminals 42.

As depicted in FIG. 3, server 38 contains database 40 that stores information regarding files 12. In one embodiment, local participants gather at a common location to trade, while others tap into marketplace 14 remotely. In a marketplace 14 that supports local participation, one or more local computer terminals 42 may be connected to server 38 through a local area network, or LAN. Local selling participants 16 and local buying participants 18 access data on files 12 by connecting to server 38. File-selling facilitators 22 and file-buying facilitators 24 may also use local computer terminals 42 to access files 12 data. In another embodiment, marketplace 14 does not support local access, and all participants access file 12 information remotely.

Remote participants may include selling participants 16, file-selling facilitator 22, buying participants 18, file-buying facilitators 24, or any combination thereof. These remote participants utilize computer terminals 32 to connect to server 38 through Internet 34 to participate in trading activities in marketplace 14. In other embodiments, computer terminals 32 may connect to server 38 via a wide-area network (WAN). Such participants may also access server 38 or marketplace 14 using telephone network 36. A method of narrowing the field of loans to be purchased from all available loans, to loans that meet the criteria of the certain parameters that are entered into the computer. Such a method may be implemented through a series of menus, checkboxes, checklists, and so on. Once this is accomplished, then the review process can begin.

As in other embodiments, selling participants 16 or selling facilitators 22 provide files 12 or data describing files 12 to centralized electronic marketplace 14. Server 38 stores information or data on files 12, while buying participants 18 or buying facilitators 24 review the file 12 data and submit bids electronically or telephonically.

When deals are reached, clearing agency 20, guided by server 38, completes the buy-sell transaction by transferring funds from buying participant 18 to selling participant 16, and the note from selling participant 16 to buying participant 18.

Assuming a deal has been reached, system 10 in one embodiment employs particular rules for transfer of account to ensure the quality of the transaction and the loan.

More specifically, in one embodiment, no repurchases are allowed. Repurchases are largely responsible for many mortgage industry problems. In prior art systems, repurchases are allowed, and neither buyers nor sellers accept responsibility for poor loans and poor loan application files. Companies purchasing loans have relied too heavily on the "repurchase clause" in their contracts as a way to remove or mitigate responsibility and risk for poorly underwritten loans and risky loan offerings. Not allowing any repurchases will force buyers to perform their due diligence appropriately when reviewing files 12, or loans, for purchase. This will in turn encourage sellers selling loans to make sure their facts are straight and there are no problems with the documentation in the file, in order to get the maximum price for their loan. As such, fraud and non-disclosure of fraud and other problems will be minimized.

Further, a standard trade date may be established as part of the rules or standards of transfer of account. For example, if the standard trade date is the 15th of every month, then buyers taking ownership prior to the 15th can expect to collect the following month's payment. Sellers selling a loan after the 15th can expect to collect the following month's payment as it will not be included in their funds from the sale of the loan. Funds from the sale of a loan may include, or not include, principal, interest figured to the day of transfer, escrow balance, premium or discount, less transfer fees.

This method or standard may include standardized documents, signed by all members/participants, that will supersede any agreements that may exist between participants.

This method of employing strict, standard rules of transfer, overall and in time, will encourage full disclosure, full due diligence, accountability, and integrity in the sale and purchase of closed loans, especially individual, closed mortgage loans. Adherence to the principles of this method will substantially reduce, if not eliminate, problems that are currently being experienced by the mortgage industry.

In one embodiment, all members buying and selling files 12 will need to carry the required amount of Errors and Omission insurance, Fidelity Bond coverage, and have in place all required licensing and necessary approvals. All members will be required to take responsibility for all government rules and regulations regarding the mortgage industry and the relationship to their respective loans and related matters. Doing so will improve the overall quality of the loan, while reducing risk to all parties.

Further to this embodiment, when one member has an unresolved complaint against another member, or is seeking recourse, a relevant governing body will deal with problem solving through pre-established methods of dispute resolution.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A method of trading individual, closed residential mortgage loans in an open-market forum, without loans being presented in a structured pool, comprising:

authorizing, through the use of a computer, a file associated with an individual, closed residential mortgage loan to be made available by a seller to a plurality of potential buyers for the opportunity to perform simultaneous, and real time, due diligence and bidding;

converting substantially all loan documents associated with the loan in the file into electronic file documents for submittal to the plurality of potential buyers, wherein the loan documents comprise information that allows each of the plurality of buyers to perform simultaneous due diligence in real time for the purpose of placing a bid on the loan prior to a purchase of the loan and to assess the risk and value of the loan;

making the electronic file documents simultaneously available in real time to the plurality of potential buyers for review, due diligence, and purchase, wherein the electronic file documents are not pooled or averaged prior to making the electronic file documents available to the plurality of potential buyers, thereby making the risk of the individual, closed mortgage loan transparent to the plurality of potential buyers;

receiving a bid from one or more of the potential buyers on the individual, closed residential mortgage loan, wherein the bid is a winning bid that represents a binding agreement to buy the individual, closed residential mortgage loan if the bid is the first bid that matches the seller's offer or is a bid that is otherwise accepted by the seller;

accepting the bid as the winning bid and forwarding a note associated with the file to a clearing agency for delivery to the potential buyer;

receiving funds from the clearing agency into a seller account as payment for the individual, closed residential mortgage loan.

2. The method of claim 1, wherein the loan documents include at least one of: a loan application, loan summarization, insurance information, appraisal information, copy of note, copy of security instrument, loan payment history, principal balance, settlement statement, income verification, employment verification, certificates of compliance with laws, closing documents, credit report, automated valuation method information, loan-servicing information, prepayment information, repurchase information, recapture information, prepayment penalty information, and risk-rating instruments.

3. The method of claim 2, wherein the insurance information is selected from the group consisting of title insurance information, homeowner's insurance information, and mortgage insurance information.

4. The method of claim 2, wherein the loan-servicing information is selected from the group consisting of: service calls log with collection activity, foreclosure information, loan payment history, loan payment agreements, loan payment deferments, information on whether servicing will be released or retained, and any written or verbal agreements with a borrower associated with the loan.

5. The method of claim 1, further comprising establishing a standard rules of transfer of account to be accepted by each potential buyer.

6. The method of claim 5, wherein the standard rules of transfer of account include a no repurchase requirement so as to improve loan quality.

7. The method of claim 1, further comprising using a computer and software to narrow the field of loans to be purchased from all available loans to loans that meet the criteria of the certain parameters that are entered into the computer, then reviewing the loan.

8. A system for trading individual, closed residential mortgage loans without loans being presented in a structured pool, comprising:
   a plurality of individual, closed residential mortgage loans, each individual loan having a file of electronic data comprising substantially all loan documents associated with the individual loan, the loan documents having been converted into electronic file documents and comprising information for performing simultaneous due diligence in real time for the purpose of placing a bid on the loan prior to a purchase of the individual loan and to assess the risk and value of the individual loan, the plurality of mortgage loans not being presented in a structured pool;
   a marketplace comprising at least one seller computer, and at least one potential buyer computer in communication with the seller, through an electronic network, wherein the network may be one of the Internet, local area network, wide area network, telephone network, or combination thereof, that allows for simultaneous, real time interaction of the at least one seller and the at least one potential buyer, for the purpose of price negotiation;
   a computer database comprising the electronic file documents, the computer database located in a location remote to at least one potential buyer, the electronic file documents being simultaneously available in real time to the marketplace through the electronic network for review, due diligence, and purchase, wherein the electronic file documents are not pooled or averaged prior to making the electronic file documents available to the marketplace, thereby making the risk of the individual, closed mortgage loan transparent to the marketplace, and thereby allowing for simultaneous, real time due-diligence and bidding from the at least one buyer;
   a microprocessor configured to implement the steps of submitting the electronic file documents to the plurality of potential buyers and receiving an individual bid on the loan prior to the purchase of the loan; and
   wherein the electronic network receives the individual bid from the at least one potential buyer for the individual loans, and the bid is a winning bid that represents a binding agreement to buy the individual, closed residential mortgage loan if the bid is a first bid that matches a seller's offer or is a bid that is otherwise accepted by the seller and the electronic network facilitates processing a sale of the individual loan through a clearing agency by accepting the bid as the winning bid and forwarding a note associated with the file to a clearing agency for delivery to the potential buyer and by receiving funds from the clearing agency into a seller account as payment for the individual, closed residential mortgage loan.

9. The system of claim 8, wherein the loan documents include at least one of: a loan application, loan summarization, insurance information, appraisal information, copy of note, copy of security instrument, loan payment history, principal balance, settlement statement, income verification, employment verification, certificates of compliance with laws, closing documents, credit report, automated valuation method information, loan-servicing information, prepayment information, repurchase information, recapture information, prepayment penalty information, and risk-rating instruments.

* * * * *